(12) United States Patent
Liu et al.

(10) Patent No.: US 12,343,299 B2
(45) Date of Patent: Jul. 1, 2025

(54) SYSTEMS AND METHODS FOR OPERATING SEXUAL STIMULATION DEVICE BASED ON REAL-TIME ANALYSIS OF SEXUAL CONTENT

(71) Applicant: HYTTO PTE. LTD, Singapore (SG)

(72) Inventors: Dan Liu, Guangzhou (CN); Jilin Qiu, Guangzhou (CN)

(73) Assignee: HYTTO PTE. LTD., Singapore (SG)

( * ) Notice: Subject to any disclaimer, the term of this patent is extended or adjusted under 35 U.S.C. 154(b) by 0 days.

(21) Appl. No.: 18/944,598

(22) Filed: Nov. 12, 2024

(65) Prior Publication Data
US 2025/0064670 A1  Feb. 27, 2025

Related U.S. Application Data

(63) Continuation-in-part of application No. 18/754,742, filed on Jun. 26, 2024, which is a continuation-in-part of application No. 18/170,895, filed on Feb. 17, 2023.

(51) Int. Cl.
*A61H 19/00* (2006.01)
*G06V 40/16* (2022.01)
*G06V 40/20* (2022.01)

(52) U.S. Cl.
CPC .......... *A61H 19/00* (2013.01); *G06V 40/161* (2022.01); *G06V 40/23* (2022.01); *A61H 2201/5012* (2013.01)

(58) Field of Classification Search
None
See application file for complete search history.

(56) References Cited

U.S. PATENT DOCUMENTS

| | | | |
|---|---|---|---|
| 10,576,013 B1 | 3/2020 | Sloan | |
| 11,185,465 B2 | 11/2021 | Sloan | |
| 11,478,398 B2 | 10/2022 | Sloan | |
| 11,589,116 B1 | 2/2023 | Omar et al. | |
| 2006/0079732 A1* | 4/2006 | Blumenthal | G06F 3/011 600/38 |
| 2023/0039784 A1 | 2/2023 | Sloan | |
| 2023/0116280 A1 | 4/2023 | Li | |
| 2023/0252775 A1 | 8/2023 | Lee | |

OTHER PUBLICATIONS

Office Action (Non-Final Rejection) dated Oct. 16, 2024, issued in parent U.S. Appl. No. 18/754,742.

* cited by examiner

*Primary Examiner* — Thaddeus B Cox

(74) *Attorney, Agent, or Firm* — Holtz, Holtz & Volek PC

(57) ABSTRACT

The present invention relates to methods and systems for operating a sexual stimulation device of the user based on real time analysis of sexual content of the video. The method performed by a server system includes facilitating a communication between at least one user device and a sexual stimulation device of a user. The method includes performing selection of the target video frames of a video representing the sexual content being displayed in the user device. Further, the method includes extracting features from the target video frames of the video based on artificial intelligence (AI) models. The method further includes generating a control signal including parameters corresponding to the features. The method includes transmitting the control signal to the user device associated with the user for operating the sexual stimulation device to provide sexual stimulation to the user corresponding to the sexual content being displayed in the video.

20 Claims, 10 Drawing Sheets

SYSTEMS AND METHODS FOR OPERATING SEXUAL STIMULATION DEVICE BASED ON REAL-TIME ANALYSIS OF SEXUAL CONTENT

CROSS-REFERENCE TO RELATED APPLICATIONS

This application is a Continuation-In-Part of U.S. application Ser. No. 18/754,742, filed Jun. 26, 2024, which is a Continuation-In-Part of U.S. application Ser. No. 18/170,895, filed Feb. 17, 2023, the entire disclosure of each of which is incorporated herein by reference.

TECHNICAL FIELD

The present invention relates generally to sexual stimulation devices, and more particularly relates to systems and methods for controlling a sexual stimulation device associated with a user based on a real-time analysis of sexual content being displayed on a user device of the user.

BACKGROUND

Sexual stimulation can be achieved by an individual or a group of individuals (irrespective of gender) by using sex toys. Typically, conventional sex toys are self-operated by the individual for experiencing the sexual stimulation. However, the individual may not always feel the same level of sexual stimulation at every instance using the conventional sex toys as they have limited operating functionality. Additionally, the arousals of the individual may change periodically based on mood and environment, thus the stimulation produced by the conventional sex toys may not satisfy the needs/desires of the individual.

Currently, social media and the ability to extend wireless interfaces, local and wide area networking, etc., have contributed to new methods and systems for experiencing sexual stimulation. In one example scenario, the sexual stimulation devices may be manually operated by the individual while viewing the sexual content. In another example scenario, the user may access third party application services that offer predefined patterns for controlling the sex toys. Further, the third party application services may allow the user to define/create patterns corresponding to the sexual content for operating the sex toys. However, the human intervention for creating the patterns for operating the sex toys is a time consuming process. Further, the pattern created by the user may be unsynchronized with the sexual content, which may result in unsatisfied sexual experience while operating the sex toy.

Therefore, there is a need for systems and methods for creating control patterns without human intervention in order to operate the sex toys for providing a satisfying sexual stimulation experience to the users, in addition to providing other technical advantages.

SUMMARY

Various embodiments of the present disclosure disclose methods and systems for operating a sexual stimulation device of the users based on real-time analysis of sexual content.

In an embodiment, a computer-implemented method is disclosed. The computer-implemented method performed by a server system includes facilitating a communication between at least one user device and a sexual stimulation device associated with a user via an application equipped in the at least one user device of the user. The method includes performing selection of one or more target video frames of a video representing sexual content being displayed in the at least one user device. The one or more target video frames is selected based at least on performing a real-time analysis of the sexual content in the video. Further, the method includes extracting at least one feature from the one or more target video frames of the video based at least on one or more artificial intelligence (AI) models. The at least one feature includes a visual feature. The method further includes generating a control signal including parameters corresponding to the at least one feature being extracted from the one or more target video frames of the video. The parameters of the control signal are determined based at least on quantifying the at least one feature with predefined weights. The method includes transmitting the control signal in real time to the at least one user device associated with the user for operating the sexual stimulation device to provide sexual stimulation to the user corresponding to the sexual content being displayed in the video.

In another embodiment, a server system is disclosed. The server system includes a memory configured to store instructions and a processor. The processor is configured to execute the instructions stored in the memory and thereby cause the server system to at least facilitate a communication between at least one user device and a sexual stimulation device associated with a user via an application equipped in the at least one user device of the user. The server system is caused to perform selection of one or more target video frames of a video representing sexual content being displayed in the at least one user device. The one or more target video frames is selected based at least on performing a real-time analysis of the sexual content in the video. Further, the server system is caused to extract at least one feature from the one or more video frames of the video based at least on one or more artificial intelligence (AI) models. The at least one feature includes an acoustic feature and a visual feature. The server system is further caused to generate a control signal comprising parameters corresponding to the at least one feature being extracted from the one or more target video frames of the video. The parameters of the control signal are determined based at least on quantifying the at least one feature with predefined weights. The server system is caused to transmit the control signal in real time to the at least one user device associated with the user for operating the sexual stimulation device to provide the sexual stimulation to the user corresponding to the sexual content being displayed in the video.

BRIEF DESCRIPTION OF THE FIGURES

The following detailed description of illustrative embodiments is better understood when read in conjunction with the appended drawings. For the purposes of illustrating the present disclosure, exemplary constructions of the disclosure are shown in the drawings. However, the present disclosure is not limited to a specific device, or a tool and instrumentalities disclosed herein. Moreover, those in the art will understand that the drawings are not to scale. Wherever possible, like elements have been indicated by identical numbers.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearances of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or conjunction with each other, one skilled in the art will appreciate that many of these features can be provided independently of other features.

Various embodiments of the present invention are described hereinafter with reference to FIG. 1 to FIG. 7.

Figure 1:
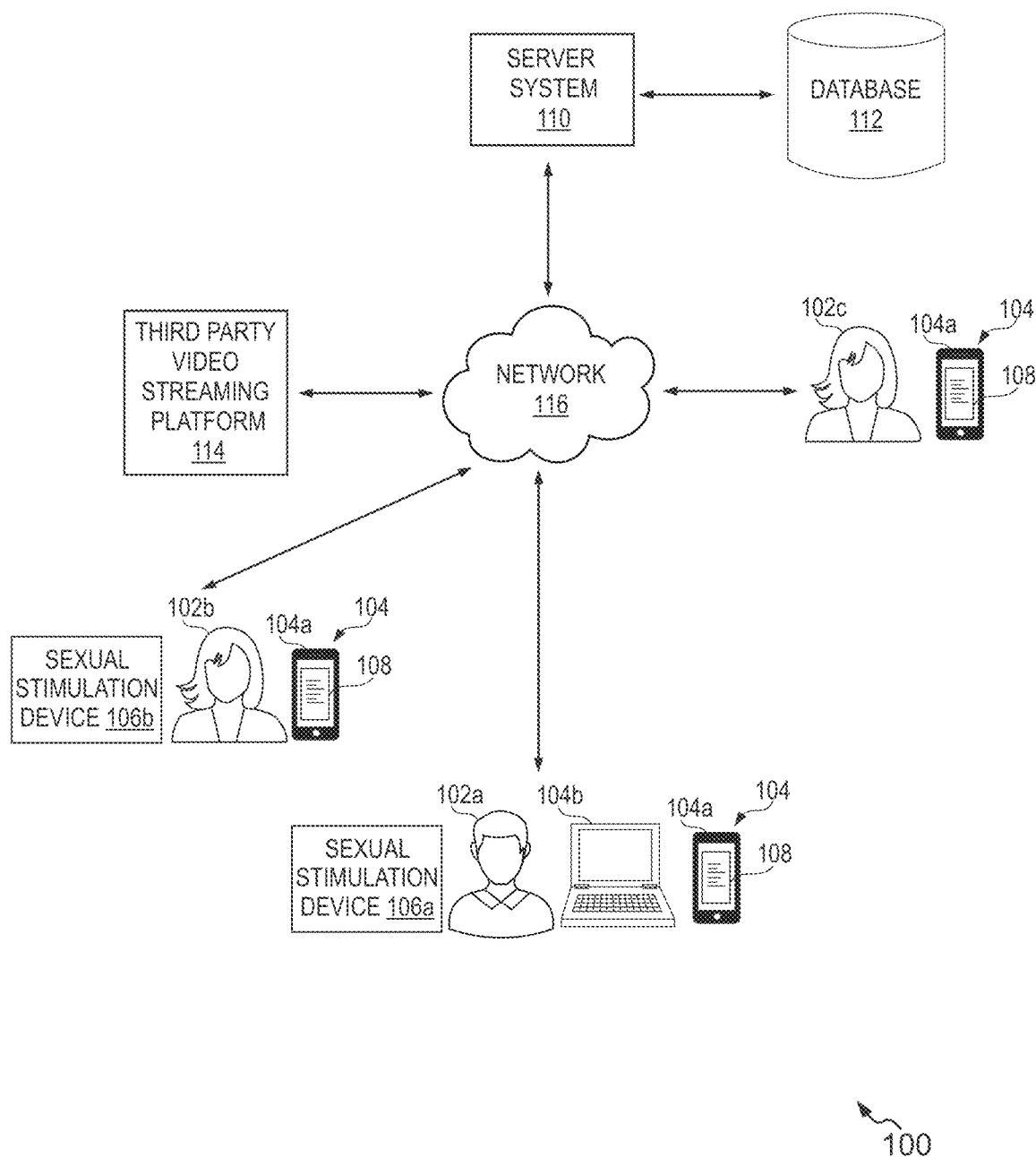
FIG. 1 illustrates an example representation of an environment related to at least some example embodiments of the present disclosure.

FIG. 1 illustrates an example representation of an environment 100 related to at least some example embodiments of the present disclosure. Although the environment 100 is presented in one arrangement, other arrangements are also possible where the parts of the environment 100 (or other parts) are arranged or interconnected differently. The environment 100 generally includes a plurality of users 102 (collectively referred for a user 102a, a user 102b and a user 102c). The user 102a and the user 102b are exemplarily depicted to be a male user and a female user. Further, the user 102c may be a content creator. Further each of the users 102a, 102b, and 102c are associated with at least one user device 104. The at least one user device 104 includes a first user device 104a and a second user device 104b. The first user 104a and the second user device 104b are exemplarily depicted to be a mobile phone and a computer, respectively. Alternatively, the at least one user device 104 may include tablet, a laptop computer, a phablet computer, a handheld personal computer, a virtual reality (VR) device or any other devices. It is to be noted that each of the users 102a-102c are associated with the at least one user device 104 as explained above. For example, the user 102a (male user) is associated with both the first user device 104a and the second user device 104b (i.e., mobile phone and computer), and the user 102b (female user) and the user 102c are associated with only the first user device 104a (i.e., mobile phone).

Further, the users 102a and 102b are associated with a sexual stimulation device 106a and a sexual stimulation device 106b, respectively. The sexual stimulation devices 106a and 106b are selected based on a gender of the users 102a-102c. For instance, the sexual stimulation device 106a is a male sex toy and the sexual stimulation devices 106b is a female sex toy. Some examples of the sexual stimulation device (female sex toys) may include, but are not limited to, a dildo, a vibrator, and male sex toys may include, masturbators and the like. The sexual stimulation devices 106a and 106b may be connected wirelessly with the first user device 104a associated with the users 102a and 102b. Some examples of the wireless connectivity for enabling connection between the sexual stimulation devices 106a and 106b and the at least one user device 104 may be, but not limited to, near field communication (NFC), wireless fidelity (Wi-Fi), Bluetooth and the like.

Various entities in the environment 100 may connect to a network 116 in accordance with various wired and wireless communication protocols, such as Transmission Control Protocol and Internet Protocol (TCP/IP), User Datagram Protocol (UDP), 2nd Generation (2G), 3rd Generation (3G), 4th Generation (4G), 5th Generation (5G) communication protocols, Long Term Evolution (LTE) communication protocols, or any combination thereof. In some instances, the network 116 may include a secure protocol (e.g., Hypertext Transfer Protocol (HTTP)), and/or any other protocol, or set of protocols. In an example embodiment, the network 116 may include, without limitation, a local area network (LAN), a wide area network (WAN) (e.g., the Internet), a mobile network, a virtual network, and/or another suitable public and/or private network capable of supporting communication among two or more of the entities illustrated in FIG. 1, or any combination thereof.

In an embodiment, the first and second user devices 104a and 104b are equipped with an instance of an application 108. The application 108 may be hosted and managed by a server system 110. The application 108 corresponds to a sex toy management application for operating the sexual stimulation devices 106a and 106b based on a control signal which will be explained further in detail. In one embodiment, the server system 110 may provide the application 108, in response to a request received from the at least one user device 104 associated with the users 102a-102c via the network 116. In another embodiment, the application 108 may be factory-installed on the at least one user device 104. In another embodiment, the user device such as, the user device 104a may access an instance of the application 108 from the server system 110 for installing on the user device 104a using application stores associated with operating systems such as Apple iOS®, Android™ OS, Google Chrome OS, Symbian OS®, Windows Mobile® OS, and the like.

The server system 110 is embodied in at least one computing device in communication with the network 116. The server system 110 may be specifically configured, via executable instructions to perform one or more of the operations described herein. In general, the server system 110 is configured to determine the control pattern based on performing a real-time analysis of a video containing sexual content being played/recorded in the at least one user device 104. In one scenario, the video may be played in the user device 104 by the server system 110. In another scenario, the video may be played in the user device 104 by a third-party video streaming platform 114. In an embodiment, the server system 110 may be communicably coupled with the third-party video streaming platform 114. The third-party video streaming platform 114 may have made a contractual agreement with the application 108 to comply with privacy and security requirements of the application 108 and/or the server system 110. Based on the contractual agreement, the third-party video streaming platform 114 may facilitate the server system 110 to perform a real-time analysis of the video rendered by the third-party video streaming platform 114 in the at least one user device 104 via the application 108 equipped in the user device 104.

As explained above, the at least one user device 104 (generally the first user device 104a) associated with the users 102a and 102b are wirelessly connected to their respective sexual stimulation devices 106a and 106b. It is to be noted that the sexual stimulation devices 106a and 106b may be either in direct communication or indirect communication with the user device 104 of the users 102a-102c.

In one scenario, the sexual stimulation device 106a of the user 102a may be connected to the first user device 104a via the wireless communication protocols. In this scenario, the video containing the sexual content may be stored in a local storage of the first user device 104 and played in the first user device 104a. Thus, the application 108 (or the server system 110) with access to the first user device 104a to generate the control pattern based on a real-time analysis of the sexual content being played in the first user device 104a. In another scenario, the server system 110 may be configured to render the video containing the sexual content to the first user device 104a of the user 102a. In such scenario, the server system 110 may perform real-time analysis of the sexual content in the video for generating the control pattern in order to operate the sexual stimulation device 106a of the user 102a. In another scenario, the video containing the sexual content may be rendered by the third-party video streaming platform 114 onto the second user device 104b associated with the user 102a. In this scenario, the server system 110 may monitor the sexual content of the video in the second user device 104b via the application 108 equipped in the second user device 104b. Thereafter, the server system 110 generates the control signal corresponding to the sexual content in the video and transmits the control signal to the first user device 104a of the user 102a for operating the sexual stimulation device 106a.

The server system 110 performs a real-time analysis of the sexual content in the video as explained above. More specifically, the server system 110 may perform selection of one or more target video frames of the video representing the sexual content displayed on the at least one user device 104. For instance, the one or more target video frames may include selective target frames containing the sexual content in the video or all video frames of the video. The server system 110 may include one or more artificial intelligence (AI) models stored in a database 112 associated with the server system 110. As such, the server system 110 including the AI models trained with training data facilitates selection of the video frames in the video being played/recorded in the at least one user device 104. Thereafter, the server system 110 is configured to extract at least one feature from the one or more target video frames of the video based at least on the artificial intelligence (AI) models. Upon extracting the features, the server system 110 creates the control signal including parameters corresponding to the extracted features. The parameters may include information related to a type of sexual stimulation device, frequency and amplitude, and the like. The control signal is transmitted to the user device (i.e., the user device 104a) for operating the sexual stimulation device 106a to provide sexual stimulation to the user 102a corresponding to the sexual content displayed in the video.

In an embodiment, the third-party video streaming platform 114 may render a live stream broadcast of the content creator (i.e., the user 102c) to the at least one user device 104. The live streaming broadcast may contain the sexual content being performed by the user 102c. In this scenario, the server system 110 may analyze actions performed by the user 102c and create the control signal accordingly for operating the sexual stimulation devices 106a and 106b of the users 102a and 102b, respectively.

The number and arrangement of systems, devices, and/or networks shown in FIG. 1 are provided as an example. There may be additional systems, devices, and/or networks; fewer systems, devices, and/or networks; different systems, devices, and/or networks, and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of the environment 100 may perform one or more functions described as being performed by another set of systems or another set of devices of the environment 100.

Figure 2:
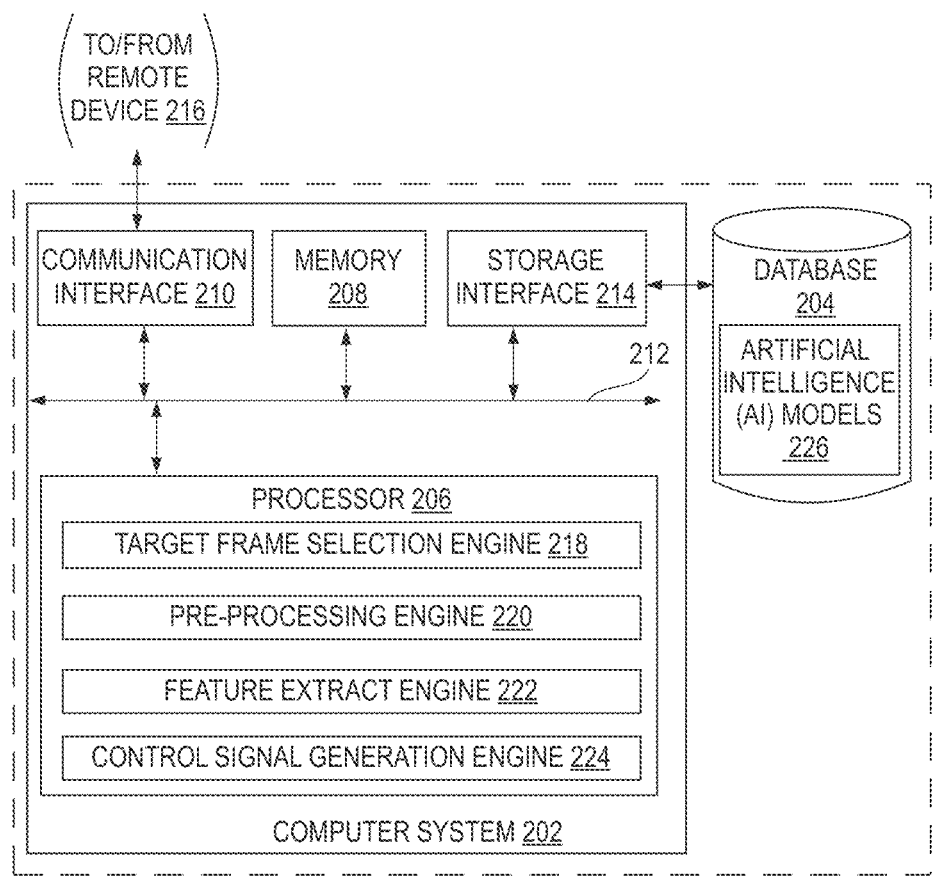
FIG. 2 illustrates a simplified block diagram of a server system used for generating a control signal based on real-time analysis of sexual content in a video for operating a sexual stimulation device associated a user, in accordance with an embodiment of the present disclosure.

FIG. 2 illustrates a simplified block diagram of a server system 200 used for generating control signals based on real-time analysis of the sexual content in the video for operating the sexual stimulation device associated the users, in accordance with an embodiment of the present disclosure. Examples of the server system 200 include, but are not limited to, the server system 110 as shown in FIG. 1. The server system 200 includes a computer system 202 and a database 204. The computer system 202 includes at least one processor 206 for executing instructions, a memory 208, a communication interface 210, and a storage interface 214. The one or more components of the computer system 202 communicate with each other via a bus 212.

In one embodiment, the database 204 is integrated within the computer system 202 and configured to store an instance of the application 108 and one or more components of the application 108. Further, the database 204 may be configured to store one or more artificial intelligence (AI) models 226. The AI models 226 may be trained with training data. The training data may include, but not limited to, sexual content data, control signals data, audio data corresponding to the sexual content and feature points. The computer system 202 may include one or more hard disk drives as the database 204. The storage interface 214 is any component capable of providing the processor 206 access to the database 204. The storage interface 214 may include, for example, an Advanced Technology Attachment (ATA) adapter, a Serial ATA (SATA) adapter, a Small Computer System Interface (SCSI) adapter, a redundant array of independent disks (RAID) controller, a storage area network switch (SAN) adapter, a network adapter, and/or any component providing the processor 206 with access to the database 204.

The processor 206 includes suitable logic, circuitry, and/or interfaces to execute computer-readable instructions. Examples of the processor 206 include, but are not limited to, an application-specific integrated circuit (ASIC) processor, a reduced instruction set computing (RISC) processor, a complex instruction set computing (CISC) processor, a field-programmable gate array (FPGA), and the like. The memory 208 includes suitable logic, circuitry, and/or interfaces to store a set of computer-readable instructions for performing operations. Examples of the memory 208 include a random-access memory (RAM), a read-only memory (ROM), a removable storage drive, a hard disk drive (HDD), and the like. It will be apparent to a person skilled in the art that the scope of the disclosure is not limited to realizing the memory 208 in the server system 200, as described herein. In some embodiments, the memory 208 may be realized in the form of a database server or cloud storage working in conjunction with the server system 200, without deviating from the scope of the present disclosure.

The processor 206 is operatively coupled to the communication interface 210 such that the processor 206 is capable of communicating with a remote device 216 such as the at least one user device 104 associated with the users 102a-102c, the third-party video streaming platform 114, or with any entity connected to the network 116 as shown in FIG. 1.

It is noted that the server system 200 as illustrated and hereinafter described is merely illustrative of an apparatus that could benefit from embodiments of the present disclosure and, therefore, should not be taken to limit the scope of the present disclosure. It is noted that the server system 200 may include fewer or more components than those depicted in FIG. 2.

In one embodiment, the processor 206 includes a target frame selection engine 218, a pre-processing engine 220, a feature extract engine 222 and a control signal generation engine 224. As such, the one or more components of the processor 206 as described above are communicably coupled with the application 108. In an embodiment, the components (i.e., the target frame selection engine 218, the pre-processing engine 220, the feature extract engine 222 and the control signal generation engine 224) of the processor 206 can be implemented as a single module in entirety or as distributed engines (as shown in FIG. 2B). In one embodiment, the above-mentioned components of the processor 206 may be implemented in the form of a hardware module or software logic.

The target frame selection engine 218 includes a suitable logic and/or interfaces for selecting the one or more target video frames from the video displayed in real time on the at least one user device 104 of the user 102a. More specifically, the target frame selection engine 218 may be configured to access the trained AI models 226 stored in the database 204 for determining the one or more target video frames in the video. As explained above, the AI models 226 are trained with the training data. The training data may include the sexual content data i.e., genitals exposure, sex positions, nude characters, etc. Further, the trained AI models 226 implementing deep learning technique facilitates the target frame selection engine 218 to determine/select the one or more target video frames in the video being played in the at least one user device 104 of the user 102a.

In particular, the target frame selection engine 218 with access to the AI trained models 226 determines a first set of visual features corresponding to erotic factor (i.e., the sexual content) in the video. In one scenario, all video frames of the video may be considered as the one or more target video frames. In another scenario, the video frames including the first set of visual features corresponding to erotic factor (or the sexual content) in the video are considered as the one or more target video frames for further processing. In addition, the target frame selection engine 218 is configured to select at least one video frame among the one or more target video frames for further processing. For example, 10 video frames may be selected as the one or more target video frames, whereas every alternate video frame (i.e., $1^{st}$ frame, $3^{rd}$ frame, $5^{th}$ frame and so on) may be selected for further processing. In this scenario, the selection of alternate video frame from the one or more video frames corresponds to the at least one video frame. It is to be noted that the target frame selection engine 218 is configured to perform the above steps irrespective of the video being played from the local storage or rendered by the third-party video streaming platform 114 or the live stream broadcast where the characters (e.g., the user 102c) performing sexual content is displayed in the at least one user device 104 of the users 102a and 102b.

The pre-processing engine 220 includes a suitable logic and/or interfaces for determining inter-frame differencing in the video/target video frames. The pre-processing engine 220 with access to the AI models 226 may be configured to implement machine learning technique to track the one or more target video frames in the video for further processing. Specifically, the pre-processing engine 220 with access to the AI models 226 performs classification to identify whether the one or more target video frames is taken in close distance or far distance of shooting scene. In other words, the pre-processing engine 220 identifies the frame type of the one or more video frames of the sexual content in the video. The frame type includes at least a long shot frame and a close shot frame. The frame type of the one or more target video frames is identified for feature extraction which will be explained further in detail. The pre-processing engine 220 identifies the long shot frame based at least on detecting body features (e.g., genitals, chest/breasts, ass, etc.) of the characters/actors, distinctive and distinguishable from background. This facilitates identification of the sexual content in the one or more target video frames of the video. It is to be noted that the body features representing the sexual content in the video corresponds to feature points.

Further, the pre-processing engine 220 identifies the close shot frame when the body features are partially covered or the skin color is monotonous to show distinctiveness. In this scenario, the pre-processing engine 220 with access to the AI models 226 implementing AI segmentation technique separates the body features (i.e., foreground) from the background, thereby identifying the sexual content in the video. The AI segmentation technique includes Gaussian Modeling or Inter-Frame Differencing. Thereafter, the pre-processing engine 220 performs data tagging of the feature points corresponding to the body features for enabling feature extraction in case of the target video frames are detected to be the close shot frame.

Additionally, the pre-processing engine 220 may be configured to track the live video being played in the at least one user device 104 for enabling detection of the one or more target video frames in the video. More specifically, the target frame selection engine 218 along with pre-processing engine 220 with access to the AI models 226 determines the one or more target video frames in the video based on detecting the frame type in the video and identifying the sexual content in the video. It is to be noted that the pre-processing engine 220 is configured to perform the above steps irrespective of the video being played from the local storage or rendered by the third-party video streaming platform 114 or the live stream broadcast where the characters (e.g., the user 102c) performing sexual content is displayed in the at least one user device 104 of the users 102a and 102b.

The feature extraction engine 222 includes a suitable logic and/or interfaces for extracting the at least one feature from the one or more video frames of the video based at least on one or more artificial intelligence (AI) models 226. The at least one feature includes an acoustic feature and a visual feature and the frame type.

The feature extraction engine 222 may obtain audio information from the one or more target video frames containing the sexual content. The feature extraction engine 222 with access to the AI models 226 is configured to analyze the audio information to detect whether the actor in the video is screaming, moaning, groaning, or making a sound related to sexual connotation. Thereafter, the feature extraction engine 222 extracts one or more acoustic feature parameters from the audio information. The one or more feature parameters from the audio information may include, but not limited to, category, decibel, tone, periodicity and semantics. For example the acoustic feature i.e. category distinguishes speaking, moaning and background noise. It is to be noted that the AI models 226 are trained with audio data corresponding to the sexual content for determining the one or more acoustic features.

In one scenario, the feature extraction engine 222 determines the parameters of the control signal based at least on quantifying the at least one feature with predefined weights. In another scenario, the feature extraction engine 222 determines the type of sexual stimulation device, an update value for the amplitude and frequency based on performing a comparison of the one or more acoustic feature parameters with one or more preset values defined for at least the type of sexual stimulation device, amplitude and frequency.

Further, the feature extraction engine 222 extracts the visual features from the one or more target video frames. The visual features may include, but not limited to, number of actors, gender of actors, facial expressions, body parts, genre of sexual activity, and motion vectors of characters in the sexual content. As explained above, the first set of visual features are extracted based on analyzing the sexual content in the video or the one or more target video frames. In fact, the first set of visual features is a subset of the visual features. In other words, extracting the visual features include extracting the first set of visual features. Thus, the feature extraction engine 222 in conjunction with the pre-processing engine 220 extracts the first set of visual features in the video for at least performing the selection of the one or more target video frames in the video and extracting feature parameters from the one or more target video frames. As explained above, the first set of visual features are extracted by the feature extraction engine 222 in conjunction with the pre-processing engine 220 based at least on the AI models implementing deep learning technique.

Moreover, the feature extraction engine 222 extracts a second set of visual features corresponding to motion information of at least the characters of the sexual content in the one or more target video frames of the video based at least on the AI models 226 implementing a cyclic neural network. That is, the input for the trained AI models 226 is the one or more target video frames and the output is the parameters of the control signal corresponding to the visual features. As explained above, the frame type of the one or more target video frames may be at least the long shot frame and/or the close shot frame. In case of long shot frame, the feature extraction engine 222 identifies the characters of the sexual content in the video and their associated feature points for extracting the second set of visual features. Specifically, the feature points of the characters in the sexual content are identified and their motion information are tracked to determine the second set of visual features. In case of close shot frame, the feature extraction engine 222 identifies the feature points in the target video frames upon pre-processing the target video frames by the pre-processing engine 220. For example, the feature points may be genitals, ass, chest, facial expression of the characters in a current position. In this scenario, the feature extraction engine 222 identifies the above mentioned features points in the close shot frame and tracks the change in current position in subsequent video frames of the video for obtaining the motion information of the features points based at least on one or more feature detection techniques. The motion information (i.e., motion trajectory, displacement, and change in unit time) of the feature points being extracted from the target video frames of at least the long shot frame and the close shot frame corresponds to the second set of visual features. In other words, the feature extraction engine 222 computes the change in position of the feature points between consecutive video frames of the sexual content in the video for determining the second set of visual features in the one or more target video frames.

The control signal generation engine 224 includes a suitable logic and/or interfaces for generating the control signal including the parameters corresponding to the at least one feature being extracted from the target video frames. More specifically, the control signal generation engine 224 integrates the acoustic features, the visual features (i.e., the first and second set of visual features) and the frame type for determining the control signal including the parameters. The parameters of the control signal corresponding to the acoustic features includes at least one of type of sexual stimulation device (such as the sexual stimulation device 106a or 106b), amplitude and frequency.

In one scenario, the control signal generation engine 224 defines the parameters for the control signal corresponding to the acoustic features. The control signal generation engine 224 performs a comparison of the acoustic feature parameters with the corresponding preset values defined for at least the type of sexual stimulation device, amplitude and frequency. Based on the comparison, the control signal generation engine 224 determines the type of sexual stimulation device, an update value for the amplitude and frequency. In another scenario, the control signal generation engine 224 determines the parameters for the control signal corresponding to the visual features (i.e., the first and second set of visual features) and the frame type of the target video frames.

More specifically, the control signal generates the parameters for the control signal based on predefined weight associated with the at least one feature (i.e., the acoustic features and the visual features) of the target video frames. The gender of the characters in the target video frames determines the type of sexual stimulation device. In one example scenario, if the gender of character/actor in the target video frames is a male actor, the type of sexual stimulation device is determined to be a female stimulation device (i.e., the sexual stimulation device 106b). In another example scenario, if the gender of the actor in the target video frames is a female actor, then the type of sexual stimulation device is determined to be a male sexual stimulation device (i.e., the sexual stimulation device 106a). It is evident that the parameter corresponding to the type of sexual stimulation device of the control signal is determined by identifying actors and actresses in the target video frames and user's sexual orientation. Further, the amplitude and frequency are determined based on quantifying the acoustic and visual features with the predefined weights. In an example, suppose the detection part is hand, and then setting the weight as 1, then the amplitude of the hand movement reflects the intensity/frequency in the control signal as 1:1. In another example, suppose the detection part is chest, the weight is set as 1.5, and the amplitude due to the chest movement is set as 1:1.5, which reflects the intensity/frequency of the sexual stimulation device. In another example, the human contour of the character in the target video frames is regarded as a whole (for example, in the long shot frame). In this scenario, each tracking body part is assigned with different weights. Thus, when the character moves, the reflected control signal intensity is accumulated according to each degree of body part movements and their respective weights.

In one embodiment, the server system 200 is configured to receive the one or more target video frames at a time. The one or more target video frames correspond to a category of intra-frame. The one or more target video frames determined at the first time may correspond to the first target video frames. For example, the target video frames determined at the first time may include frames #1, #3, and #5 of the video. The one or more target video frames determined at the second time may correspond to the second target video frames. For example, the target video frames determined at the second time may include frames #7, #9, and #11 of the video. It is to be noted that the one or more target video frames determined at each time are unique as explained above. Further, the server system 200 extracts a difference value between the one or more target video frames at each time based at least on the one or more artificial intelligence (AI) models 226. Further, extracting the difference value includes obtaining a foreground of each of the one or more target video frames at each time. Thereafter, the server system 200 identifies at least one image factor in terms of at least color, texture, and line of the foreground and performs a comparison of the one or more target video frames received at each time with respect to the at least one image factor to determine the difference value for the target video frames received at each time. Further, the server system 200 determines the parameters for the control signal corresponding to the difference value between the one or more target video frames at each time. For example, for the first target video frames and the second target video frames, corresponding signal parameters are determined by the AI models 226. The parameters of the control signal corresponding to the one or more target video frames at each time include at least one of amplitude and frequency. Thus, it is to be noted that the parameters for the control signal are determined based on a comparison of the target video frames corresponding to Intra-frame at each time, without the need to compare with a consecutive set of target frames (i.e., Inter-frame).

In an embodiment, the server system 200 may render a live stream broadcast of a content creator (e.g., the user 102c) in the application 108 equipped in the at least one user device 104 of the user 102a. In this scenario, the server system 200 performs real-time analysis of actions (i.e., sexual content) being performed by the user 102c that is live streaming in the user device 102a. Thereafter, the server system 200 generates the control signal based on detection of the actions performed by the content creator in the live streaming. Further, the server system 200 transmits the control signal to the at least one user device 104 (or the first user device 104a) of the user 102a for operating the sexual stimulation device 108a to provide sexual stimulation to the user 102a corresponding to the actions performed in the live streaming by the content creator (i.e., the user 102c). In an embodiment, the third party video streaming platform may render the live stream broadcast of the user 102c in the at least one user device 104 of the user 102a. In this scenario, the server system 200 may track the live stream broadcast performed by the user 102c in the at least one user device 104 (the first user device 104a or the second user device 104b) for generating the control signal. Further, performing real-time analysis of the sexual content in the live stream broadcast is similar to the real-time analysis of the sexual content being rendered in the at least one user device 104. Therefore, the process of performing real-time analysis of the live stream broadcasting of the user 102c in the at least one user device 104 and generating the control signal are not reiterated for the sake of brevity.

Further, server system 200 is configured to detect the type of sexual stimulation device (e.g., the sexual stimulation devices 106a and 106b) for transmitting the control signal to the users. As explained above, the user 102a is a male user, so the control signal including the parameters defined for a male sexual stimulation device is transmitted to the user 102a. Similarly, the user 102b is a female user, thus the control signal including the parameters defined for a female sexual stimulation device is transmitted to the user 102b.

In addition, the server system 200 is configured predict subsequent set of target video frames based at least on the one or more target video frames. Specifically, the server system 200 with access to the AI models 226 implementing prediction algorithms is configured to predict the subsequent set of target video frames based at least on the current video frames (e.g., the one or more target video frames). Thereafter, the server system 200 generates the control signal in real-time for a time window corresponding to the subsequent set of target video frames for operating the sexual stimulation devices 106a and 106b of the respective users 102a and 102b. Typically, the control signal including the parameters indicates strength/amplitude/frequency during a time window for the current set of one or more target video frames. For example, in 30 fps, each frame spans 33 ms, and the calculation might take 2 ms, then there will be minor latency between generating the control signal and playing that video frame regardless the signal transmission delay. In addition, the control signal can be used to describe strength/frequency during a time window for next set of one or more target video frames (i.e., the subsequent set of target video frames) based on the prediction algorithms. In other words, the parameters such as signal strength/frequency of the control signal for the next time window based on the target video frames played during the current time window can be predicted. This mitigates the latency including calculation and transmission while providing a real time execution process for generating the control signal. Further, the training data is updated by the server system 200 at regular intervals based on the control signal associated with the one or more target video frames and the predicted subsequent set of target video frames.

In an embodiment, the server system 200 may be operated to generate the control signal in an asynchronous manner. Specifically, the server system 200 may perform analysis of the video being displayed on the at least one user device 104 and generates the control signal at a later time. The control signal being generated may be stored in the application 108, thereby enabling the users 102a and 102b to operate their respective sexual stimulation devices 106a and 106b by providing inputs in the application 108. This method of generating the control signal corresponds to asynchronous analysis.

Figure 3A:
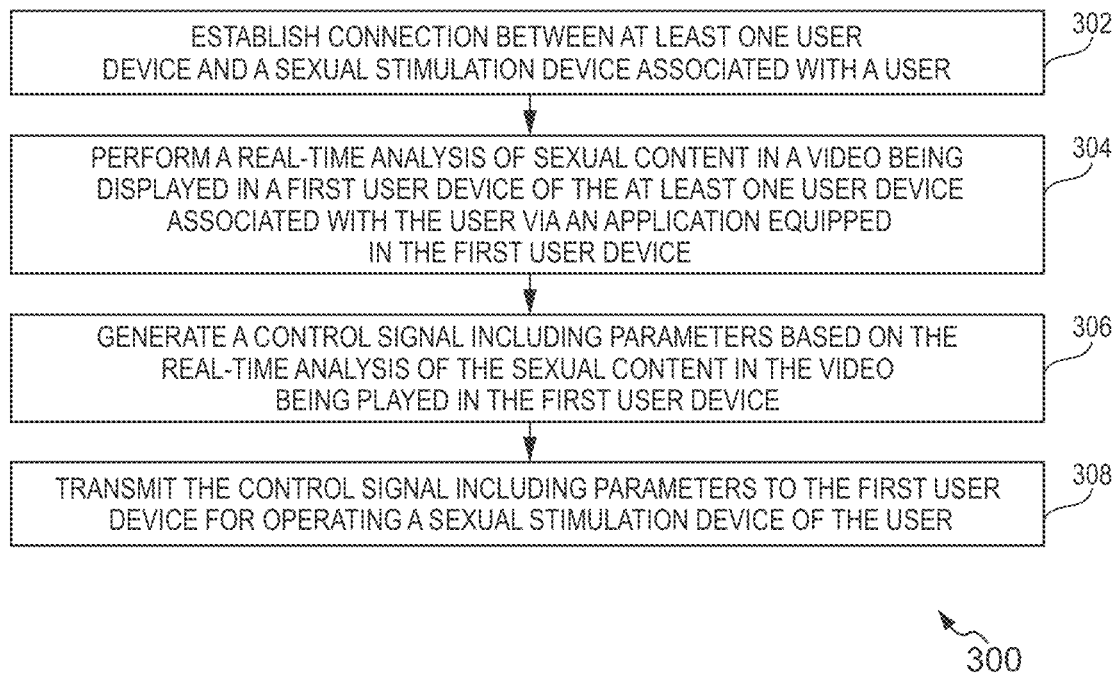
FIG. 3A represents a flowchart depicting a method flow for operating the sexual stimulation device associated with the user in case of direct communication mode, in accordance with an embodiment of the present disclosure.

FIG. 3A represents a flowchart 300 depicting a method flow for operating sexual stimulation device associated with a user in case of direct communication mode, in accordance with an embodiment of the present disclosure. The one or more operations of the flowchart 300 are performed by the server system 200 or the server system 110.

At 302, the server system 200 establishes a communication between the at least one user device 104 associated with a user (e.g., the user 102a) and the sexual stimulation device 106a. In this case, the first user device 104a (i.e., mobile phone) is considered. The first user device 104a is equipped with the application 108. The sexual stimulation device 106a associated with the user 102a is wirelessly connected to the first user device 104a. This enables the application 108 to operate the sexual stimulation device 106a.

At 304, the server system 200 performs a real-time analysis of the sexual content being video being played on the first user device 104a of the at least one user device 104 of the user 102a. In one scenario, the video containing the sexual content may be accessed or stored in a local storage of the first user device 104a. The user 102a may play the video containing the sexual content that is stored in the local storage of the first user device 104a. In another scenario, the video containing the sexual content may be rendered by the server system 200 to the first user device 104a. For example, the application 108 may store one or more sexual content videos for rendering to the user device. In another scenario, the server system 200 may render the live stream broadcast of the user 102c in the application 108. Further, the server system 200 tracks the video being played on the first user device 104a via the application 108.

At 306, the server system 200 generates the control signal including parameters based on real-time analysis of the sexual content in the video being played in the first user device 104a. In particular, the server system 200 generates the control signal including the parameters based at least on the AI models 226 as explained with reference to FIG. 2.

At 308, the server system 200 transmits the control signal including parameters to the first user device 104a. In this scenario, the application 108 operates the sexual stimulation device 106a to provide sexual stimulation to the user 102a while the user 102a is watching the sexual content in the first user device 104a. Similarly, the operations 302-308 of the flowchart 300 are implemented for the user 102b therefore they are not reiterated herein for the sake of brevity.

Figure 3B:
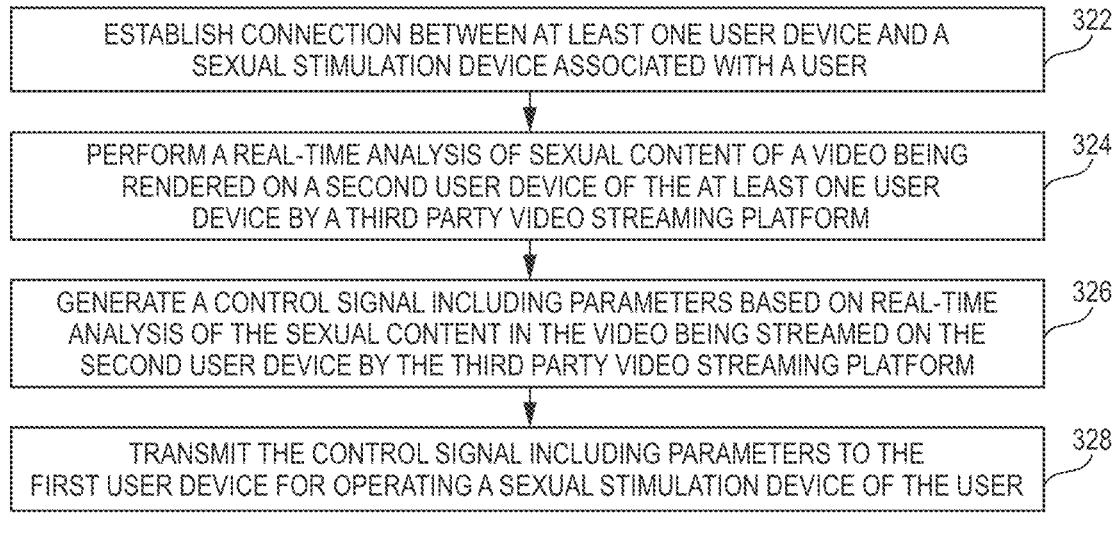
FIG. 3B represents a flowchart depicting a method flow for operating the sexual stimulation device associated with the user in case of indirect communication mode, in accordance with an embodiment of the present disclosure.

FIG. 3B represents a flowchart 320 depicting a method flow for operating sexual stimulation device associated with a user in case of indirect communication mode, in accordance with an embodiment of the present disclosure. The one or more operations of the flowchart 320 are performed by the server system 200 or the server system 110.

At 322, the server system 200 establishes a wireless connection of the at least one user device 104 and the sexual stimulation device 106a of the user 102a. In this case, the first user device 104a (i.e., mobile phone) of the at least one user device 104 is wirelessly connected to the sexual stimulation device 106a of the user 102a. This enables the application 108 to operate the sexual stimulation device 106a.

At 324, the server system 200 performs a real-time analysis of the sexual content of the video being rendered on the second user device 104b (i.e., laptop computer) of the at least one user device 104 by the third party video streaming platform 114. In this scenario, the second user device 104b may be equipped with the application 108. The server system 200 may access the sexual content of the video being played on the second user device 104b through the application 108 and perform real-time analysis of the sexual content as explained above with reference to FIG. 2.

At 326, the server system 200 generates the control signal including the parameters based on real-time analysis of the sexual content in the video being streamed in the second user device 104b by the third party video streaming platform 114. In particular, the server system 200 generates the control signal including the parameters based at least on the AI models 226 as explained with reference to FIG. 2.

At 328, the server system 200 transmits the control signal including parameters to the first user device 104a for operating the sexual stimulation device 106a to provide sexual stimulation to the user 102a while the user 102a is watching the sexual content in the second user device 104b. Similarly, the operations 322-328 of the flowchart 320 are implemented for the user 102b therefore they are not reiterated herein for the sake of brevity.

Figure 4A:
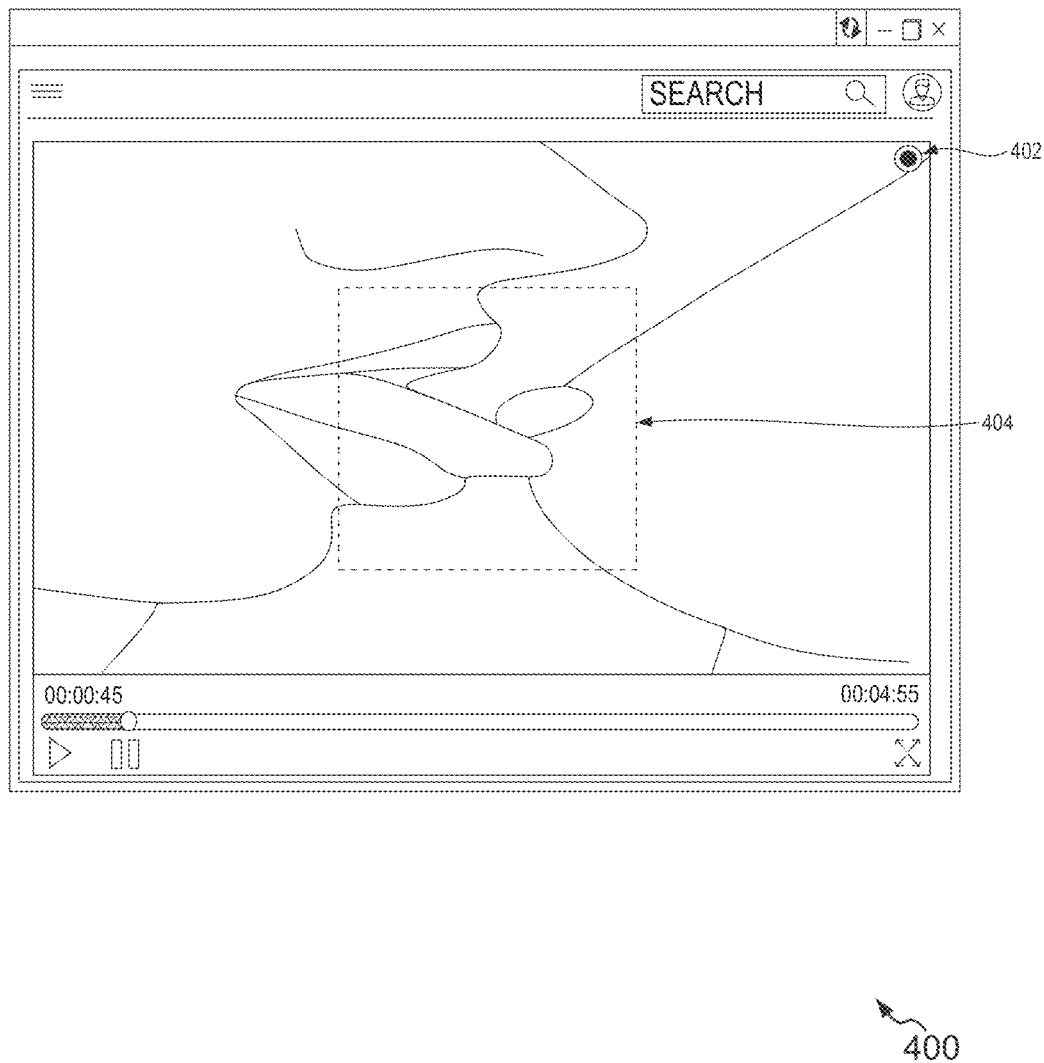
FIGS. 4A, 4B and 4C illustrate an example representation of user interface (UI) depicted on at least one user device of the user, in accordance with an embodiment of the present disclosure.

FIG. 4A illustrates an example representation of a user interface (UI) 400 depicting the sexual content of the video being rendered in the at least one user device of the user (i.e., the user 102a), in accordance with an embodiment of the present disclosure. As shown, the UI 400 is depicted on a laptop computer (i.e., the second user device 104b) associated with the user 102a. The UI 400 depicts the sexual content of the video to the user 102a.

The UI 400 may include an indication icon 402. The indication icon 402 indicates to the user 102a that the video rendered in the second user device 104b is being monitored in real-time. Further, the server system 200 identifies the frame type of the sexual content in the video to select the current video frame as the one or more target video frame or to extract the feature from the current video frame as explained above. In this scenario, the server system 200 identifies the current one or more target video frame as the close shot frame and further performs the pre-processing operation as explained with reference to FIG. 2. The UI 400 is depicted to include a selection area 404 indicated on at least human features (e.g., chest) of the actors in the video. As such, the server system 200 either selects the current video frame as the one or more target video frame or extracts the features (i.e., visual features, frame type and the audio features) from the current video frame based on identification of the selection area 404 in the current video frame. Thereafter, the server system 200 defines the parameters based on the predefined weights assigned for the feature shown in the selection area 404.

Figure 4B:
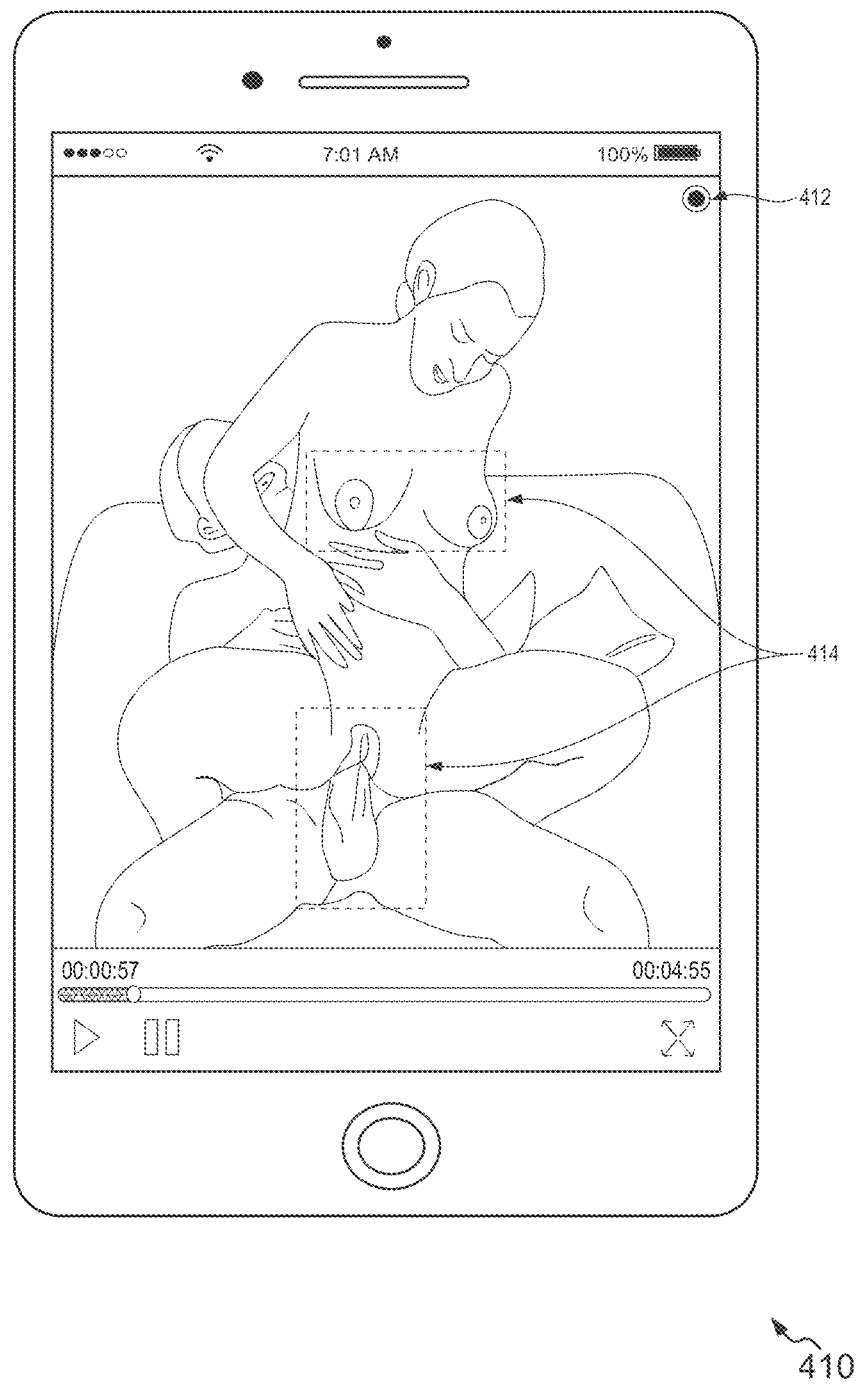

FIG. 4B illustrates an example representation of a user interface (UI) 410 depicting the sexual content of the video being rendered in the at least one user device of the user (i.e., the user 102a), in accordance with an embodiment of the present disclosure. As shown, the UI 410 is depicted on a mobile (i.e., the first user device 104a) associated with the user 102a. The UI 410 depicts the sexual content of the video to the user 102a.

Similar, to the UI 400, an indication icon 412 is rendered in the UI 410 for indicating the user 102a that the video/live stream broadcast being rendered in the first user device 104a is monitored by the server system 200 (or the application 108) in real-time. Further, the frame type of the sexual content in the video corresponds to the long shot frame as the body feature of the actor/actress is distinctive and distinguishable from background noise. Thus, the server system 200 identifies the long shot frame and may determine the current video frame as the one or more target video frame or extract the feature from the current video frame as explained above. The UI 410 is depicted to include one or more selection areas 414 indicated on human features (e.g., chest and genitals of the actor/actress) in the video. The human features in the selection areas 414 correspond to feature points. Thus, the server system 200 either selects the current video frame as the one or more target video frame or extracts the features (i.e., visual features, frame type and the audio features) from the current video frame based on identification of the selection areas 414 (or the feature points) in the current video frame. Thereafter, the server system 200 defines the parameters for the control based on the predefined weights assigned for the feature corresponding to the human features in the selection areas 414.

Figure 4C:
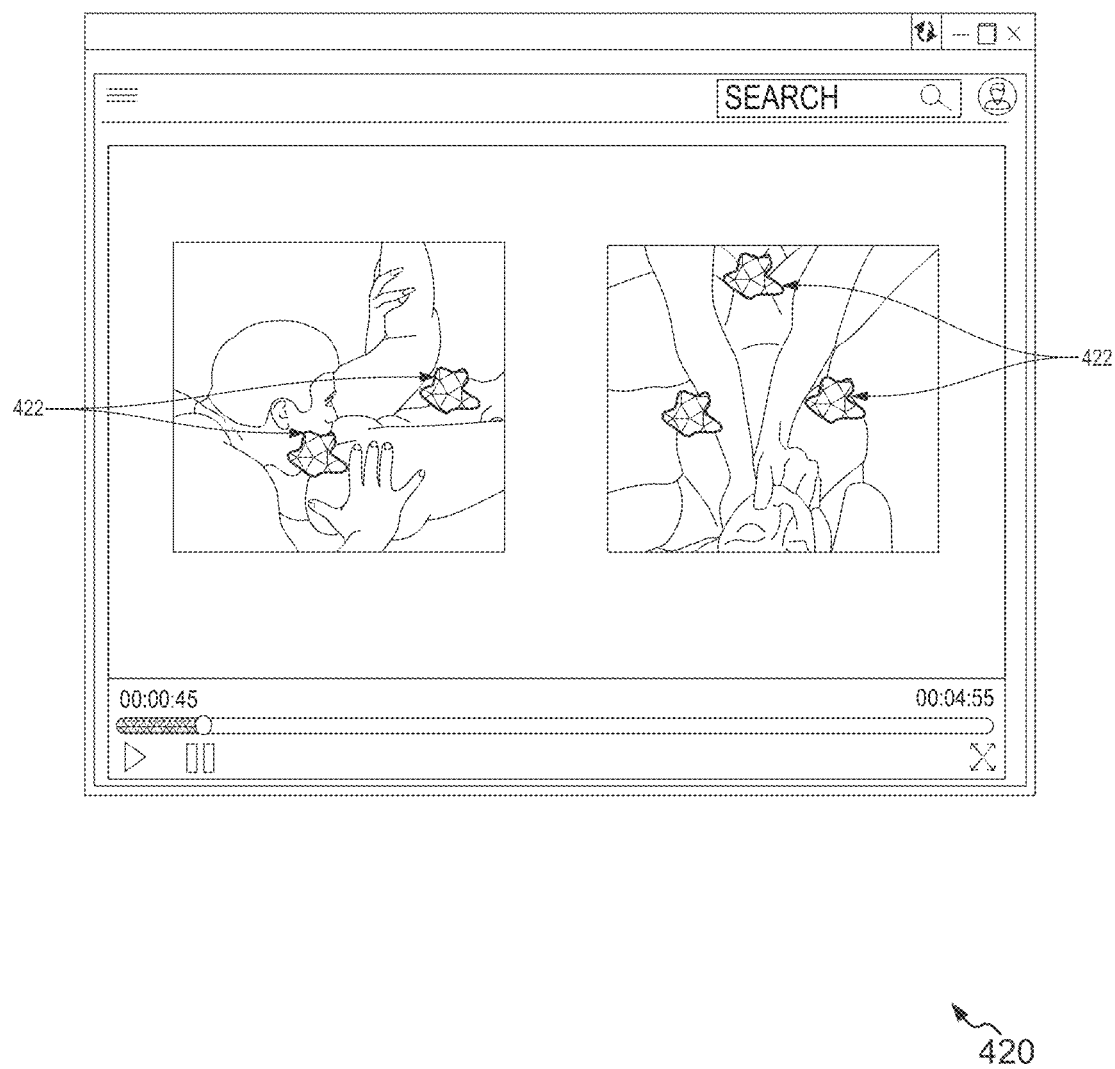

FIG. 4C illustrates an example representation of a user interface (UI) 420 depicting the sexual content of the video being rendered in the at least one user device of the user (i.e., the user 102a), in accordance with an embodiment of the present disclosure. As shown, the UI 410 is depicted on the laptop computer (i.e., the second user device 104b) associated with the user 102a. The UI 420 is depicted to include two target video frames including the sexual content of the video/live stream broadcast that are of the close shot frame. As shown, the body/human features of the actors are partially covered which results in difficult to distinguish between the human features and the background and further identification of the feature points in the sexual content being rendered in the UI 420. In this scenario, the server system 200 with access to the AI models 226 implementing the detection techniques is configured to identify the feature points in the one or more target video frame of the close shot frame. For illustration purpose, the identification of feature points are shown as shaded regions 422 in the UI 420. Thereafter, the server system 200 may select the current video frames as the one or more target video frames or extract feature from the current video frames based on the feature points identification as explained with reference to FIG. 2. It is to be noted that the UIs 400-420 depicted on the at least one user device 104 of the user 102a are exemplary. Further, the UIs 400-420 are also depicted on the at least one user device 104 associated with the user 102b.

In an embodiment, the system 200 may extract a point set representing a human body from the one or more target video frames of the video based at least on one or more artificial intelligence (AI) models. In this scenario, the server system 200 performs real-time analysis of actions (i.e., sexual content) being performed by the user 102c that is live streaming in the user device 102a. Thereafter, the system 200 may recognizes different body parts in the video frame. Specifically, the system 200 may recognizes different body parts in the video frame through the recognition of the feature points of the body parts, and obtains the point set representing different body parts. The point set including one or more key points representing at least one human body part of the head, shoulder, elbow, wrist, hip, knee, ankle, chest, and reproductive organ. Further, the system 200 acquires the coordinates of the key points of each identified body part, including the coordinates of the key points of the reproductive organ and the coordinates of the key points of at least one other human body part. For example, the coordinates of the chest and the coordinates of the buttocks, or the coordinates of the chest and the coordinates of feet, or the coordinates of the penis and the coordinates of the chest. The system 200 may analyze the coordinate differences between various body parts to infer the body posture based on the magnitude and direction of these differences. In one embodiment, the system 200 may determine the human body posture based on the calculated position of the reproductive organ, position of the other human body parts and the preset value between the reproductive organ and the other human body parts. For example, the system 200 analyzes the coordinates of the chest in relation to the head, waist, arms, legs, and shoulders to infer the human body posture. By examining the positional data of these body parts with respect to the chest, the system can categorize the posture into supine, prone, lateral, sitting, or standing positions. Thereafter, the system 200 may generate a control signal based at least on tracking of the determined human body posture. For example, in tracking the movement of a certain body part in a determined human body posture, a control signal is generated based on the movement of the tracked body part and the reproductive organs are preferred as the body part to be tracked in this scenario.

In an embodiment, the system 200 may pair the key points of the detected human body parts to form the human body skeleton structure and reconstructed the posture of the human body according to the calculated positions and distances of the key points of the human body parts and the human body skeleton structure, thereby determining the human body posture based on the calculated position of the reproductive organ, position of the other human body parts and the preset value between the reproductive organ and the other human body parts.

In an embodiment, the system 200 may match a control signal generation rule according to the determined human body posture. The system 200 may incorporate a signal generation mechanism tailored to distinct human body posture. This system 200 may track the motion characteristics of body parts under various human body posture by matching the corresponding control signal generation rule to the human body posture, and facilitate the generation of control signals based on the matched control signal generation rule. For example, when detecting a side-standing posture, the system 200 tracks the movements of the hips or pelvis or penis to generate control signals. When detecting a forward-facing seated posture, the system 200 may generate the control signals by tracking the movements of the chest.

In an embodiment, the system 200 may generate the control signal based on tracking the movement of the reproductive organ of the human body posture when the reproductive organ is detected. Or the system 200 may generate the control signal based on tracking the movement of other body parts whose correlation with the human body posture and reproductive organs meets the preset value when the reproductive organ is not detected. The system 200 further expands by considering the varying degrees of association between different body parts and the reproductive organs under different human body posture. In this context, the association between specific body parts and the reproductive organs is crucial for generating posture-specific control signals. For instance, when detecting a side-standing posture, the system 200 may focus on tracking the movements of the hips or pelvis due to their higher association with the reproductive organs. Conversely, in a forward-facing seated posture, the system 200 may prioritize tracking the chest movements for generating precise control signals.

In an embodiment, the system 200 may enhance body part motion tracking by constructing recognition regions based on characteristic points of the body parts. These recognition regions can be represented as rectangles, enabling the calculation of changes in length and width. By analyzing these changes, the system determines the motion parameters of the body parts, including the direction and distance of movement. For example, the system calculates changes in the length and width of the recognition region associated with the chest to ascertain whether the chest is moving vertically or horizontally when tracking the motion of the chest. The recognition region construction allows for precise monitoring of body part movements by capturing variations in the dimensions of the regions. By integrating recognition regions and dimension changes into the motion tracking process, the system 200 can effectively determine the movement characteristics of body parts and derive important motion parameters for further analysis and control signal generation.

In an embodiment, the system 200 may identify key body parts and characteristic points of each individual and constructs recognition regions for body part tracking. By comparing the poses and movements of the individuals, the system determines a collective posture that reflects the combined postures of the individuals in the scene. For instance, if one individual is standing upright while another is sitting, the system 200 combines these individual postures to determine a composite posture that accounts for both standing and sitting positions within the scene. This embodiment showcases the utilization of poses from multiple individuals to determine collective postures, enhancing the system's capability to analyze group dynamics and interactions based on the poses of individuals within a scene.

In an embodiment, the system 200 may determine current body postures by analyzing the poses of individuals in the scene along with the types of sex toys present. By considering both elements, the system can infer the specific sexual positions and activities being engaged in. The system 200 detects the poses of individuals and identifies the types of sex toys visible in the scene. By correlating the poses with the presence of specific sex toys, the system can deduce the sexual positions being enacted and provide insights into the nature of the sexual activities. For example, if the system 200 detects a kneeling posture combined with the presence of a bondage restraint, it may infer that a dominant-submissive sexual position is being enacted. By incorporating the analysis of both poses and the types of sex toys present, the system can offer a more nuanced understanding of the sexual activities taking place and generate the control signal corresponding to the sexual activities.

Figure 4D:
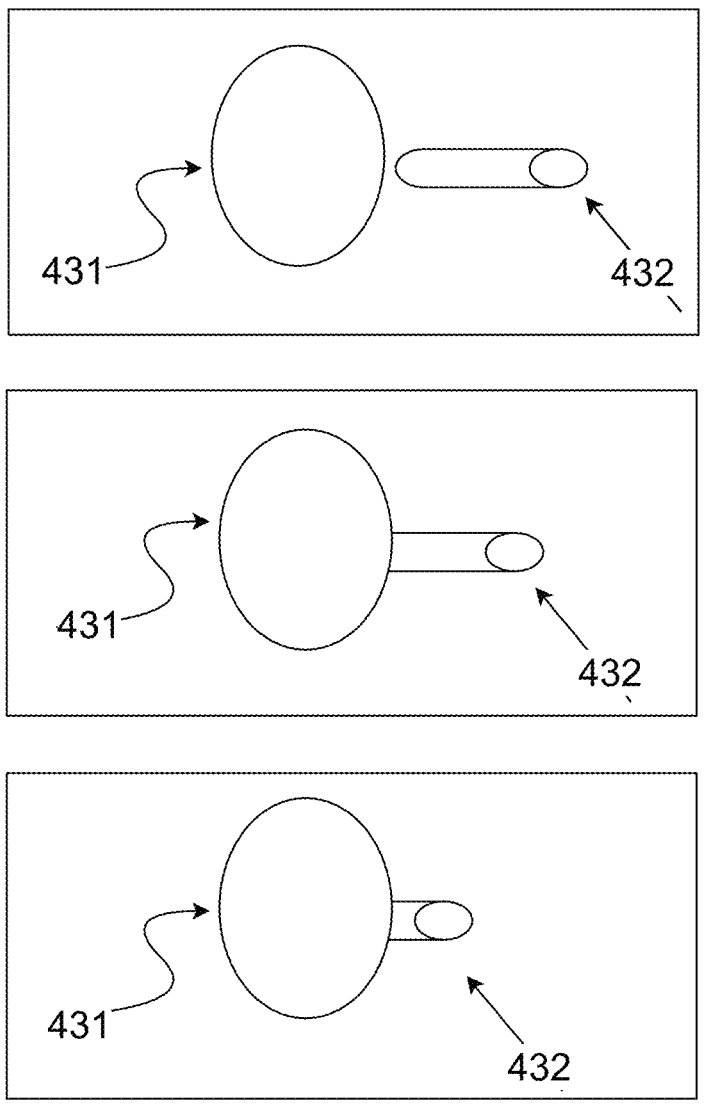
FIG. 4D illustrates an example representation of a relative length change of the reproductive organs of a previous frame and a last frame, in accordance with an embodiment of the present disclosure.

FIG. 4D illustrates an example representation of a relative length change of the reproductive organs of a previous frame and a last frame, in accordance with an embodiment of the present disclosure. As FIG. 4D shown, there are three frames and the reproductive organs comprises a first reproductive organs 431 (e.g., hip) and a second reproductive organs 432 (e.g., penis). In an embodiment, when the motion direction of at least one person in the video is determined as horizontal by the system, the system may acquire the horizontal coordinate of the penis 432 from the key points of the reproductive organ of at least one human. And then the system may calculate a difference value between the horizontal coordinate of the penis 432 in the previous frame and the horizontal coordinate of the penis 432 in the next frame. Thus, system may determine the change length of the penis 432 according to the difference value and generate the control signal based on the change length of the penis 432.

In an embodiment, the system 200 may determine a sexual positions based on the points set of the identified reproductive organ and track at least one reproductive organ as a target organ. And then, the system 200 may determined the relative length change of the target organs based on the points set of the target organ, For example, as shown in the top frame of FIG. 4D, the system 200 may take penis 432 as the target organ, and then determine the length (L1) of the penis 432 based on the extracted point set of the penis 432. As shown in the middle frame of FIG. 4D, the system 200 may the determine the length (L2) of the penis 432 based on the extracted point set of the penis 432. And as shown in the bottom frame of FIG. 4D, the system 200 may the determine the length (L3) of the penis 432 based on the extracted point set of the penis 432. Based on the lengths of the penis 432 (L1, L2, and L3) determined in different frames, the system 200 may determine the direction of the sexual intercourse and the movement relationship of the human body in the video. Further, the system 200 may determine a relative length change of the reproductive organs (e.g., penis 432) based on calculating the lengths of the penis 432 in different frames. Also, the system 200 may generate a control signal based at least on the determined the relative length change of the reproductive organs and transmit the control signal in real time to the at least one user device associated with the user for operating the sexual stimulation device to provide sexual stimulation to the user corresponding to the sexual content being displayed in the video.

Figure 5:
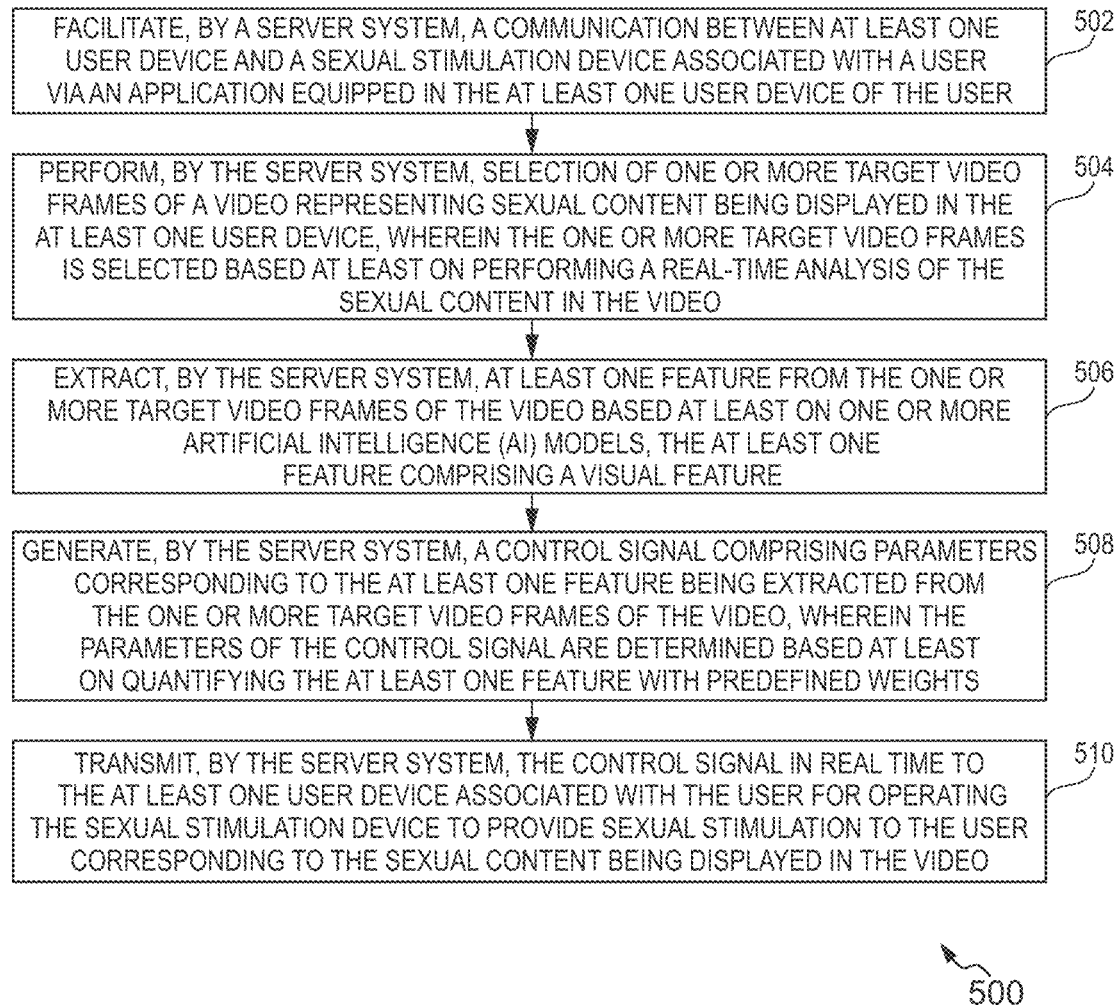
FIG. 5 illustrates a flow diagram of a computer-implemented method for operating the sexual stimulation device associated with the user based on real-time analysis of the sexual content in the video, in accordance with an embodiment of the present disclosure.

FIG. 5 illustrates a flow diagram of a computer-implemented method 500 for operating a sexual stimulation device associated with a user based on real-time analysis of the sexual content in a video, in accordance with an embodiment of the present disclosure. The method 500 depicted in the flow diagram may be executed by, for example, the server system 200 or the server system 110. Operations of the flow diagram of the method 500, and combinations of the operations in the flow diagram of the method 500, may be implemented by, for example, hardware, firmware, a processor, circuitry, and/or a different device associated with the execution of software that includes one or more computer program instructions. It is noted that the operations of the method 500 can be described and/or practiced by using a system other than these server systems. The method 500 starts at operation 502.

At operation 502, the method 500 includes facilitating, by a server system, a communication between at least one user device and a sexual stimulation device associated with a user via an application equipped in the at least one user device of the user.

At operation 504, the method 500 includes performing, by the server system, selection of one or more target video frames of a video representing the sexual content being displayed in the at least one user device. The one or more target video frames are selected based at least on performing a real-time analysis of the sexual content in the video.

At operation 506, the method 500 includes extracting, by the server system, at least one feature from the one or more video frames of the video based at least on one or more artificial intelligence (AI) models. The at least one feature includes a visual feature.

At operation 508, the method 500 includes generating, by the server system, a control signal comprising parameters corresponding to the at least one feature being extracted from the one or more target video frames of the video. The parameters of the control signal are determined based at least on quantifying the at least one feature with predefined weights.

At operation 510, the method 500 includes transmitting, by the server system, the control signal in real time to the at least one user device associated with the user for operating the sexual stimulation device to provide sexual stimulation to the user corresponding to the sexual content being displayed in the video. Further, the operations related to selection of the one or more target video frames, extracting of the feature, and generating the control signal including parameters for operating the sexual stimulation device are already explained with reference to FIGS. 1 to 4A-4C, and therefore they are not reiterated, for the sake of brevity.

Figure 6:
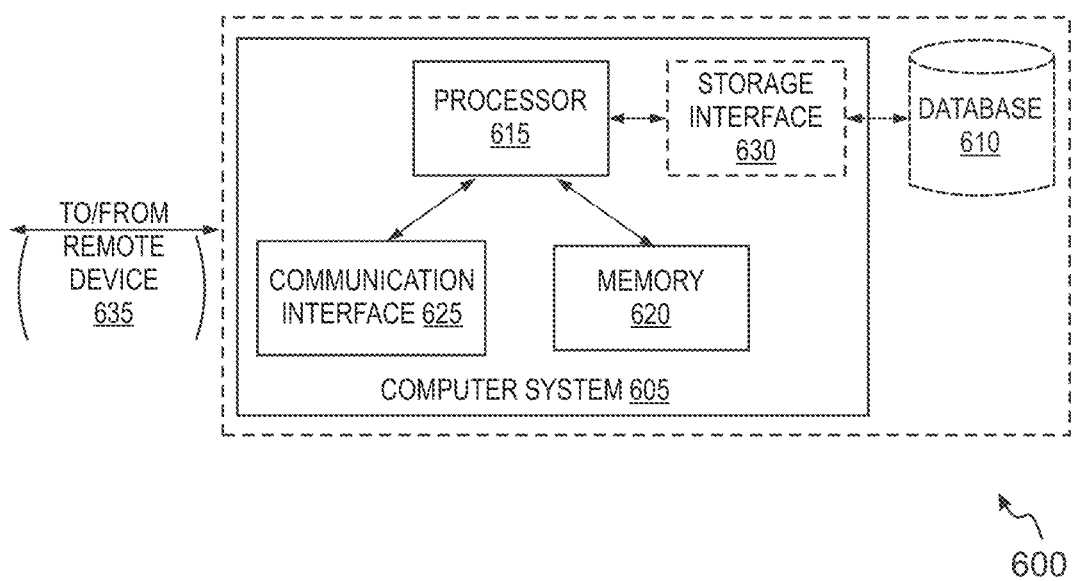
FIG. 6 illustrates a simplified block diagram representation of a third party video streaming platform, in accordance with an embodiment of the present disclosure.

FIG. 6 is a simplified block diagram of a third party video streaming platform 600, in accordance with one embodiment of the present disclosure. The third party video streaming platform 600 is an example of the third party video streaming platform 114 of FIG. 1. The third party video streaming platform 600 may be a separate part, and may operate apart via the network 116 (as shown in FIG. 1). The third party video streaming platform 600 renders the video containing the sexual content to the at least one user device 104 of the users 102a and 102b. The third party video streaming platform 600 includes a computer system 605 and a database 610.

The computer system 605 includes at least one processor 615 for executing instructions. Instructions may be stored in, for example, but not limited to, a memory 620. The processor 615 may include one or more processing units (e.g., in a multi-core configuration). The processor 615 is operatively coupled to a communication interface 625 such that the computer system 605 is capable of communicating with remote device 635 such as the server system 200. For example, the communication interface 625 may receive requests from the server system 200 for accessing the video rendered by the third party video streaming platform 600 in the user device 104a or the user device 104b.

The processor 615 may also be operatively coupled to the database 610. The database 610 is any computer-operated hardware suitable for storing videos containing the sexual content. In some embodiment, the database 610 is integrated within the computer system 605. For example, the database 610 may include multiple storage units such as hard disks and/or solid-state disks in a redundant array of inexpensive disks (RAID) configuration. The database 610 may include a storage area network (SAN) and/or a network attached storage (NAS) system. In some embodiments, the database 610 is integrated within the computer system 605. For example, the computer system 605 may include one or more hard disk drives as the database 610. In other embodiments, the database 610 is external to the computer system 605 and may be accessed by the computer system 605 using a storage interface 630. The storage interface 630 is any component capable of providing the processor 615 with access to the database 610. The storage interface 630 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 615 with access to the database 610.

In an embodiment, the third party video streaming platform 600 is configured to live stream broadcast the sexual content performed by the user (e.g., the user 102c) to the audience (e.g., the users 102a and 102b). Further, the functionalities associated with the third party video streaming platform 600 are explained above, and therefore they are not reiterated herein, for the sake of brevity.

Figure 7:
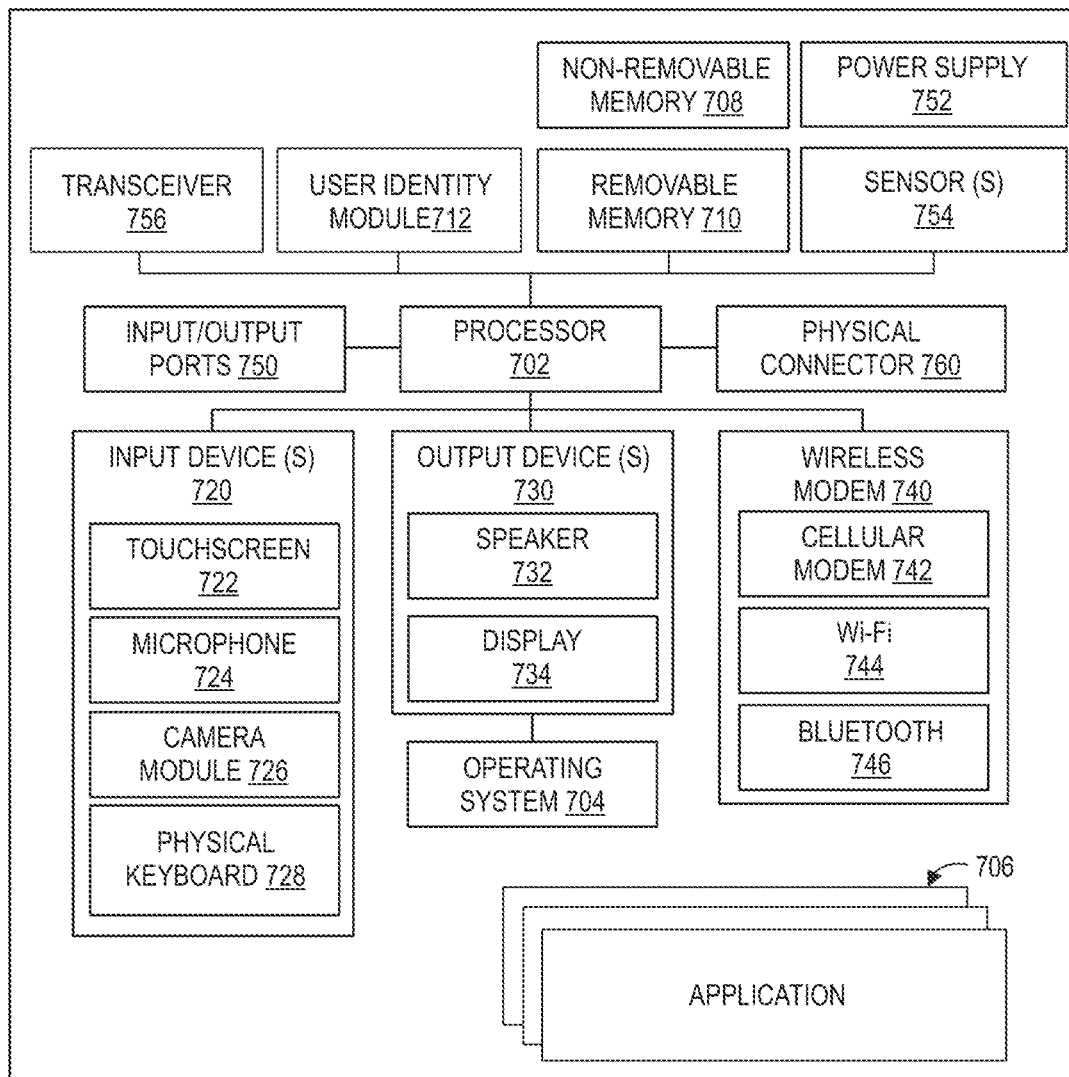
FIG. 7 is a simplified block diagram of an electronic device capable of implementing various embodiments of the present disclosure.

FIG. 7 is a simplified block diagram of an electronic device 700 capable of implementing various embodiments of the present disclosure. For example, the electronic device 700 may correspond to the user devices 104a and 104b of FIG. 1. The electronic device 700 is depicted to include one or more applications 706. For example, the one or more applications 706 may include the application 108 of FIG. 1. One of the one or more applications 706 installed on the electronic device 700 is capable of communicating with a server (i.e., the server system 200 or the server system 110) for operating the sexual stimulation device of the user based on real-time analysis of the sexual content in the video being played in the electronic device 700.

It should be understood that the electronic device 700 as illustrated and hereinafter described is merely illustrative of one type of device and should not be taken to limit the scope of the embodiments. As such, it should be appreciated that at least some of the components described below in connection with the electronic device 700 may be optional and thus in an embodiment may include more, less or different components than those described in connection with the embodiment of the FIG. 7. As such, among other examples, the electronic device 700 could be any of a mobile electronic device, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 700 includes a controller or a processor 702 (e.g., a signal processor, microprocessor, ASIC, or other control and processing logic circuitry) for performing such tasks as signal coding, data processing, image processing, input/output processing, power control, and/or other functions. An operating system 704 controls the allocation and usage of the components of the electronic device 700 and supports for one or more operations of the application (see, the applications 706) that implements one or more of the innovative features described herein. In addition, the applications 706 may include common mobile computing applications (e.g., telephony applications, email applications, calendars, contact managers, web browsers, messaging applications) or any other computing application.

The illustrated electronic device 700 includes one or more memory components, for example, a non-removable memory 708 and/or removable memory 710. The non-removable memory 708 and/or the removable memory 710 may be collectively known as a database in an embodiment. The non-removable memory 708 can include RAM, ROM, flash memory, a hard disk, or other well-known memory storage technologies. The removable memory 710 can include flash memory, smart cards, or a Subscriber Identity Module (SIM). The one or more memory components can be used for storing data and/or code for running the operating system 704 and the applications 706. The electronic device 700 may further include a user identity module (UIM) 712. The UIM 712 may be a memory device having a processor built in. The UIM 712 may include, for example, a subscriber identity module (SIM), a universal integrated circuit card (UICC), a universal subscriber identity module (USIM), a removable user identity module (R-UIM), or any other smart card. The UIM 712 typically stores information elements related to a mobile subscriber. The UIM 712 in form of the SIM card is well known in Global System for Mobile (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 700 can support one or more input devices 720 and one or more output devices 730. Examples of the input devices 720 may include, but are not limited to, a touch screen/a display screen 722 (e.g., capable of capturing finger tap inputs, finger gesture inputs, multi-finger tap inputs, multi-finger gesture inputs, or keystroke inputs from a virtual keyboard or keypad), a microphone 724 (e.g., capable of capturing voice input), a camera module 726 (e.g., capable of capturing still picture images and/or video images) and a physical keyboard 728. Examples of the output devices 730 may include, but are not limited to, a speaker 732 and a display 734. Other possible output devices can include piezoelectric or other haptic output devices. Some devices can serve more than one input/output function. For example, the touch screen 722 and the display 734 can be combined into a single input/output device.

A wireless modem 740 can be coupled to one or more antennas (not shown in FIG. 7) and can support two-way communications between the processor 702 and external devices, as is well understood in the art. The wireless modem 740 is shown generically and can include, for example, a cellular modem 742 for communicating at long range with the mobile communication network, a Wi-Fi compatible modem 744 for communicating at short range with an external Bluetooth-equipped device or a local wireless data network or router, and/or a Bluetooth-compatible modem 746. The wireless modem 740 is typically configured for communication with one or more cellular networks, such as a GSM network for data and voice communications within a single cellular network, between cellular networks, or between the electronic device 700 and a public switched telephone network (PSTN).

The electronic device 700 can further include one or more input/output ports 750, a power supply 752, one or more sensors 754 for example, an accelerometer, a gyroscope, a compass, or an infrared proximity sensor for detecting the orientation or motion of the electronic device 700 and biometric sensors for scanning biometric identity of an authorized user, a transceiver 756 (for wirelessly transmitting analog or digital signals) and/or a physical connector 760, which can be a USB port, IEEE 1294 (FireWire) port, and/or RS-232 port. The illustrated components are not required or all-inclusive, as any of the components shown can be deleted and other components can be added.

The disclosed method with reference to FIG. 5, or one or more operations of the server system 200 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, netbook, Web book, tablet computing device, smartphone, or other mobile computing devices). Such software may be executed, for example, on a single local computer or in a network environment (e.g., via the Internet, a wide-area network, a local-area network, a remote web-based server, a client-server network (such as a cloud computing network), or other such networks) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such a suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application-specific integrated circuit (ASIC) circuitry and/or in Digital Signal Processor (DSP) circuitry).

Particularly, the server system 200 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer-readable media. Non-transitory computer-readable media include any type of tangible storage media. Examples of non-transitory computer-readable media include magnetic storage media (such as floppy disks, magnetic tapes, hard disk drives, etc.), optical magnetic storage media (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer-readable media. Examples of transitory computer-readable media include electric signals, optical signals, and electromagnetic waves. Transitory computer-readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
   facilitating, by a server system, communication between at least one user device and a sexual stimulation device associated with a user via an application equipped in the at least one user device;
   performing, by the server system, selection of one or more target video frames of a video representing sexual content being displayed in the at least one user device, wherein the one or more target video frames are selected based at least on performing a real-time analysis of the sexual content in the video;
   extracting, by the server system, a point set representing a human body from the one or more target video frames of the video based at least on one or more artificial intelligence (AI) models, wherein the point set includes two or more key points, the two or more key points including a key point representing a reproductive organ and at least one other key point representing at least one other human body part from among a head, a shoulder, an elbow, a wrist, a hip, a knee, an ankle, and a chest;
   acquiring, by the server system, coordinates of the key point of the reproductive organ and coordinates of the at least one other key point of the at least one other human body part;
   calculating, by the server system, a position of the reproductive organ, a position of the at least one other human body part, and a preset value between the reproductive organ and the at least one other human body part based on the coordinates of the key points of the reproductive organ and the at least one other human body part;
   determining, by the server system, a human body posture based on at least one of the calculated position of the reproductive organ, the calculated position of the at least one other human body part, and the calculated preset value between the reproductive organ and the at least one other human body part;
   generating, by the server system, a control signal based at least on tracking of the determined human body posture; and
   transmitting, by the server system, the control signal in real time to the at least one user device for operating the sexual stimulation device to provide sexual stimulation to the user corresponding to the sexual content being displayed in the video.

2. The computer-implemented method as claimed in claim 1, wherein generating the control signal based at least on tracking of the determined human body posture comprises:
   determining, by the server system, a control signal generation rule according to the determined human body posture; and
   generating, by the server system, the control signal based on the tracking of the determined human body posture according to the control signal generation rule,
   wherein the control signal is configured to control the sexual stimulation device to perform a predefined action corresponding to an action of the determined human body posture.

3. The computer-implemented method as claimed in claim 2, wherein the tracking of the determined human body posture comprises tracking of movement of the reproductive organ in the determined human body posture.

4. The computer-implemented method as claimed in claim 1, further comprising:
   detecting, by the server system, a type of at least one sex toy from the one or more target video frames of the video;
   determining, by the server system, an entertainment scene according to the determined human body posture and the type of the at least one sex toy;
   generating, by the server system, the control signal based on the tracking of the determined human body posture, movement of the at least one sex toy, and the determined entertainment scene.

5. The computer-implemented method as claimed in claim 1, further comprising:
   detecting, by the server system, human body postures of at least two people from the one or more target video frames of the video;
   determining, by the server system, an entertainment scene according to the human body postures of at least two people;
   generating, by the server system, the control signal based on tracking of the human body postures of at least two people and the entertainment scene.

6. The computer-implemented method as claimed in claim 1, wherein generating the control signal based at least on tracking of the determined human body posture comprises:
   detecting the reproductive organ and generating, by the server system, the control signal based on tracking movement of the reproductive organ of the determined human body posture;
   not detecting the reproductive organ and generating, by the server system, the control signal based on tracking movement of other body parts whose correlation with the determined human body posture and the reproductive organ meets the calculated preset value.

7. The computer-implemented method as claimed in claim 6, wherein tracking the movement of the reproductive organ of the determined human body posture comprises:

constructing an identification area of the reproductive organ according to the coordinates of the key point of the reproductive organ;

calculating a length and width of the identification area; and determining movement parameters of the reproductive organ according to changes in the length and width of the identification area, wherein the movement parameters include moving direction and moving distance.

8. The computer-implemented method as claimed in claim 1, further comprising:

determining a type of sexual stimulation device associated with the control signal to be at least one of a female sexual stimulation device and a male sexual stimulation device based on motion features related to a gender of characters in the sexual content of the video.

9. The computer-implemented method as claimed in claim 1, wherein the preset value between the reproductive organ and the other human body parts comprises at least one of a difference between horizontal coordinates of the reproductive organ and the at least one other human body part, and a difference between vertical coordinates of the reproductive organ and the at least one other human body part.

10. The computer-implemented method as claimed in claim 9, further comprising:

pairing, by the server system, the key points of detected human body parts to form a human body skeleton structure;

reconstructing, by the server system, a posture of the human body according to calculated positions and distances of the key points of the human body parts and the human body skeleton structure, thereby determining the human body posture based on the calculated position of the reproductive organ, the calculated position of the at least one other human body part, and the calculated preset value between the reproductive organ and the at least one other human body part.

11. A system, comprising:
a communication interface;
a memory storing executable instructions; and
a processor operatively coupled with the communication interface and the memory, wherein the processor is configured to execute the executable instructions to cause the system to at least:

facilitate communication between at least one user device and a sexual stimulation device associated with a user via an application equipped in the at least one user device;

perform selection of one or more target video frames of a video representing sexual content being displayed in the at least one user device, wherein the one or more target video frames are selected based at least on performing a real-time analysis of the sexual content in the video;

extract a point set representing a human body from the one or more target video frames of the video based at least on one or more artificial intelligence (AI) models, wherein the point set includes two or more key points, the two or more key points including a key point representing a reproductive organ and at least one other key point representing at least one other human body part from among a head, a shoulder, an elbow, a wrist, a hip, a knee, an ankle, and a chest;

acquire coordinates of the key point of the reproductive organ and coordinates of the at least one other key point of the at least one other human body part;

calculate a position of the reproductive organ, a position of the at least one other human body part, and a preset value between the reproductive organ and the at least one other human body part based on the coordinates of the key points of the reproductive organ and the at least one other human body part;

determine a human body posture based on at least one of the calculated position of the reproductive organ, the calculated position of the at least one other human body part, and the calculated preset value between the reproductive organ and the at least one other human body part;

generate a control signal based at least on tracking of the determined human body posture; and transmit the control signal in real time to the at least one user device for operating the sexual stimulation device to provide sexual stimulation to the user corresponding to the sexual content being displayed in the video.

12. The system as claimed in claim 11, wherein the processor is configured to further cause the system to:

determine a control signal generation rule according to the determined human body posture; and generate the control signal based on the tracking of the determined human body posture according to the control signal generation rule, wherein the control signal is configured to control the sexual stimulation device to perform a predefined action corresponding to an action of the determined human body posture.

13. The system as claimed in claim 12, wherein the tracking of the determined human body posture comprises tracking of movement of the reproductive organ in the determined human body posture.

14. The system as claimed in claim 11, wherein the processor is configured to further cause the system to:

detect a type of at least one sex toy from the one or more target video frames of the video;

determine an entertainment scene according to the determined human body posture and the type of the at least one sex toy;

generate the control signal based on the tracking of the determined human body posture, movement of the at least one sex toy, and the determined entertainment scene.

15. The system as claimed in claim 11, wherein the processor is configured to further cause the system is further caused to:

detect human body postures of at least two people from the one or more target video frames of the video;

determine an entertainment scene according to the human body postures of at least two people;

generate the control signal based on tracking of the human body postures of at least two people and the entertainment scene.

16. The system as claimed in claim 11, wherein the processor is configured to further cause the system to:

generate the control signal based on tracking movement of the reproductive organ of the determined human body posture when the reproductive organ is detected; or generate the control signal based on tracking movement of other body parts whose correlation with the determined human body posture and the reproductive organ meets the calculated preset value when the reproductive organ is not detected.

17. The system as claimed in claim 16, wherein tracking the movement of the reproductive organ of the determined human body posture comprises:
- constructing an identification area of the reproductive organ according to the coordinates of the key point of the reproductive organ;
- calculating length and width of the identification area; and
- determining movement parameters of the reproductive organ according to changes in the length and width of the identification area, wherein the movement parameters include moving direction and moving distance.

18. The system as claimed in claim 11, wherein the preset value between the reproductive organ and the at least one other human body part comprises at least one of a difference between horizontal coordinates of the reproductive organ and the at least one other human body part, and a difference between vertical coordinates of the reproductive organ and the at least one other human body part.

19. A system, comprising:
- a communication interface;
- a memory storing executable instructions; and
- a processor operatively coupled with the communication interface and the memory, wherein the processor is configured to execute the executable instructions to cause the system to at least:
- facilitate communication between at least one user device and a sexual stimulation device associated with a user via an application equipped in the at least one user device;
- perform selection of a plurality of target video frames of a video representing sexual content being displayed in the at least one user device, wherein the plurality of target video frames are selected based at least on performing a real-time analysis of the sexual content in the video;
- extract point sets of a reproductive organ of at least one human from the plurality of target video frames of the video based at least on one or more artificial intelligence (AI) models;
- determine a relative length change of the reproductive organ based on calculating a preset value of a point set of the reproductive organ of a previous frame and a point set of the reproductive organ of a last frame;
- generate a control signal based at least on the determined relative length change of the reproductive organ; and
- transmit the control signal in real time to the at least one user device for operating the sexual stimulation device to provide sexual stimulation to the user corresponding to the sexual content being displayed in the video.

20. The system as claimed in 19, wherein the processor is configured to further cause the system to:
- calculate a difference value between at least one of a horizontal coordinate from the point set of the reproductive organ of the previous frame and a horizontal coordinate from the point set of the reproductive organ of the last frame, and a vertical from the point set of the reproductive organ of the previous frame and a vertical coordinates from the point set of the reproductive organ of the last frame;
- determine a direction of sexual movement based on the calculated difference value;
- determine the relative length change of the reproductive organ based on calculating, according to the determined direction of sexual movement, one of (i) the horizontal coordinate from the point set of the reproductive organ of the previous frame and the horizontal coordinate from the point set of the reproductive organ of the last frame, or (ii) the vertical coordinate from the point set of the reproductive organ of the previous frame and the vertical coordinate from the point set of the reproductive organ of the last frame.

* * * * *